United States Patent [19]

Hurworth

[11] Patent Number: 5,511,650

[45] Date of Patent: Apr. 30, 1996

[54] AIR-OPERATED CONVEYOR BELT TENSIONING APPARATUS

[75] Inventor: Samuel G. Hurworth, Port Angeles, Wash.

[73] Assignee: Dethur Industries, Inc., Port Angeles, Wash.

[21] Appl. No.: 356,446

[22] Filed: Dec. 13, 1994

[51] Int. Cl.⁶ .................................................. B65G 23/44
[52] U.S. Cl. ................................................. 178/813
[58] Field of Search ................................. 198/813, 814, 198/815, 806, 807, 840

[56] References Cited

U.S. PATENT DOCUMENTS

| | | | |
|---|---|---|---|
| 1,312,525 | 8/1919 | Du Brul | 198/814 X |
| 2,098,573 | 11/1937 | Dingle | 198/814 |
| 3,214,001 | 10/1965 | Callaghan | 198/814 X |
| 3,329,561 | 7/1967 | Rojecki et al. | 198/813 X |
| 3,536,185 | 10/1970 | Beck | 198/815 |
| 3,593,841 | 7/1971 | Leow | 198/806 |
| 3,993,185 | 11/1976 | Fleckenstein et al. | 198/813 |
| 4,128,952 | 12/1978 | Duke et al. | 198/813 X |
| 4,629,062 | 12/1986 | Silverthorn et al. | 198/813 |
| 5,026,326 | 6/1991 | Pollich et al. | 198/814 X |

*Primary Examiner*—D. Glenn Dayoan
*Attorney, Agent, or Firm*—Jensen & Puntigam

[57] ABSTRACT

A belt tensioning frame assembly includes opposing elongated channel members, connected by elongated plate members at the respective ends thereof. A first roller, mounted at one end of the tensioning frame assembly is positioned above the plane of the tensioning frame assembly, while a second roller is below the plane of the tensioning frame assembly, at the other end of the tensioning frame assembly. The tensioning frame assembly is rotatably mounted to a conveyor frame by bearing assemblies and a cross-support rod. The angular position of the tensioning frame assembly is controlled by two air cylinders which are connected between the conveyor frame and the two channel members of the tensioning frame assembly. The lower run of the conveyor belt extends over one of the rollers and beneath the other such that a change in the angular position of the tensioning frame assembly tends to increase or decrease tension on the belt.

5 Claims, 5 Drawing Sheets

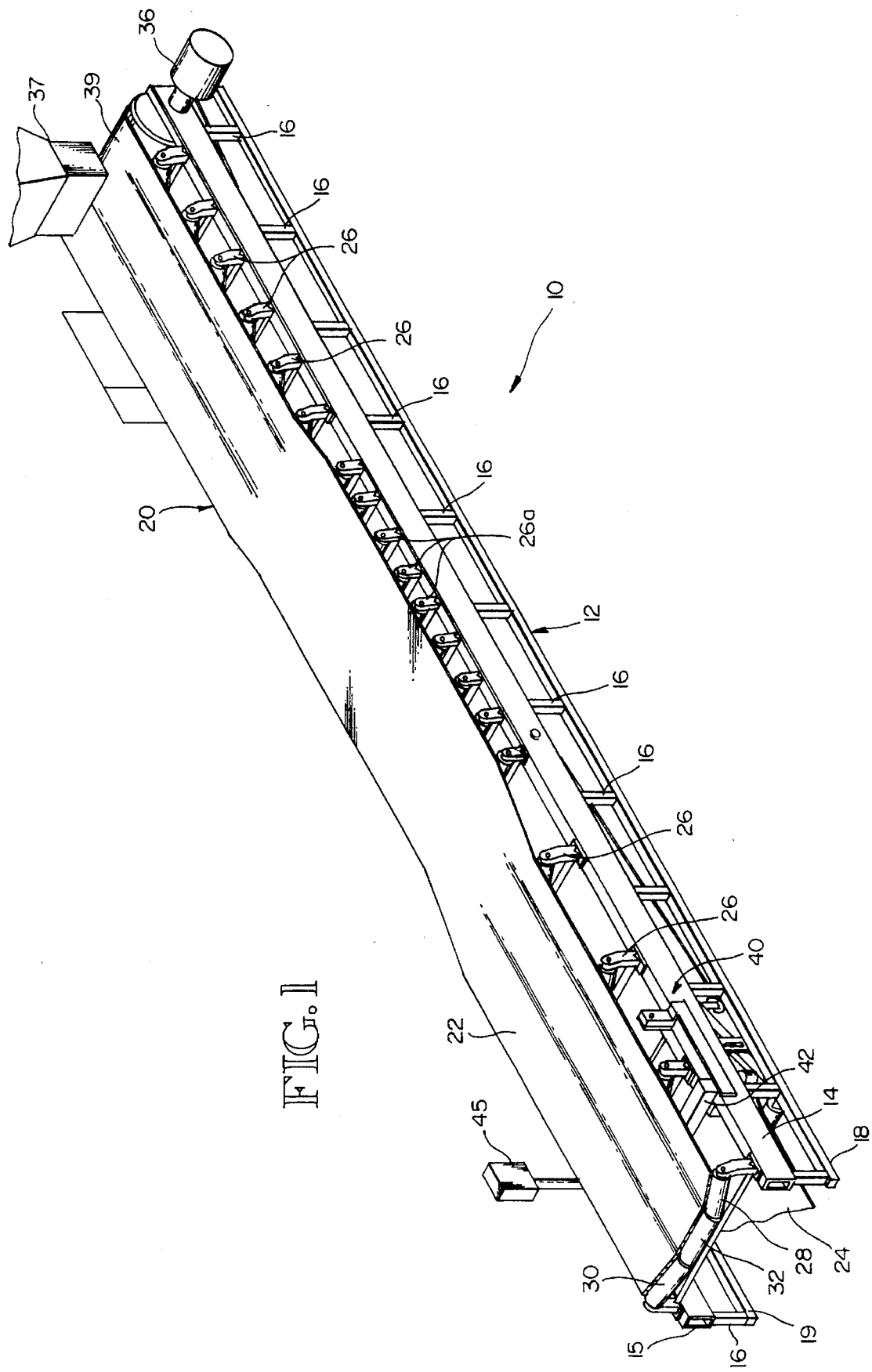

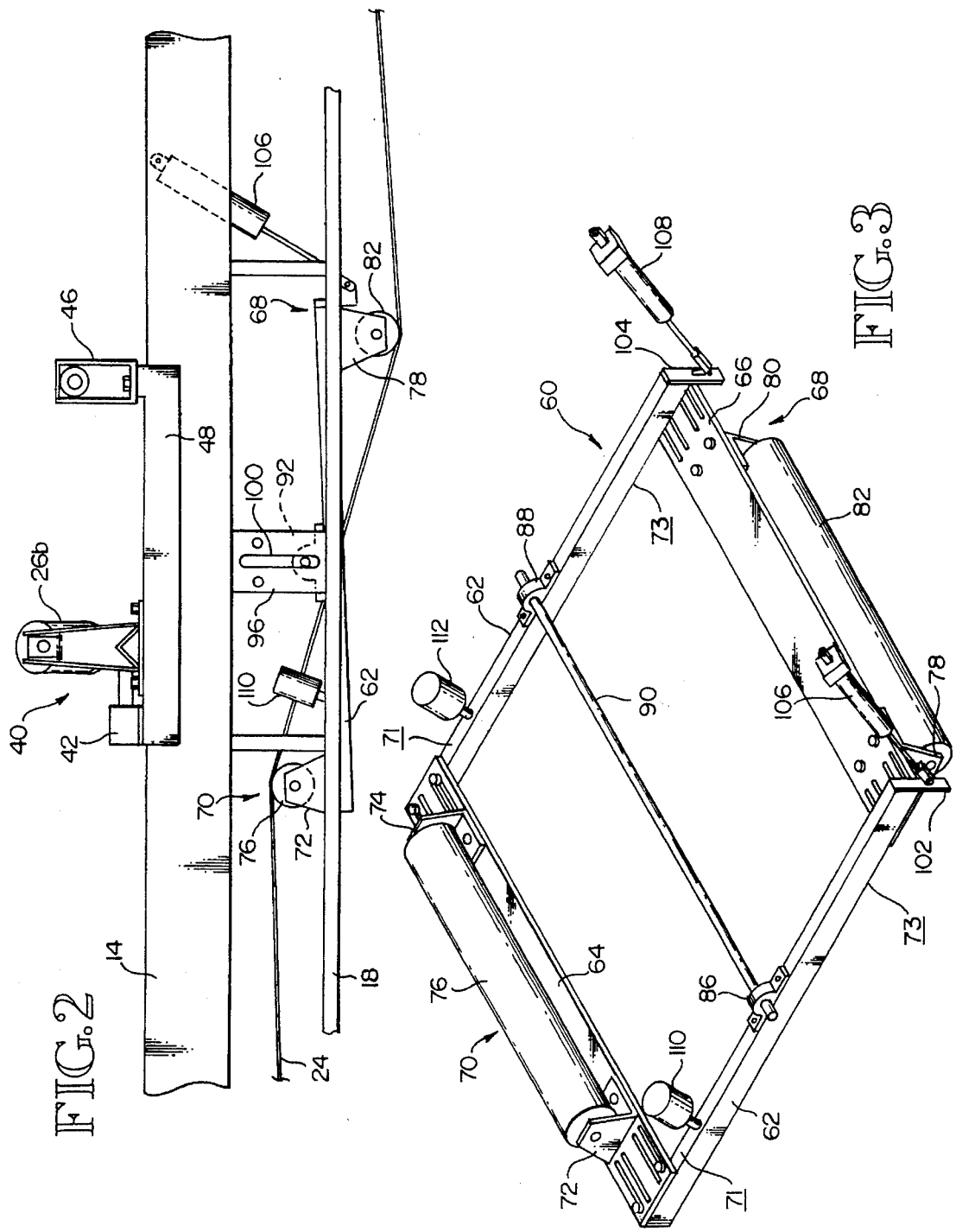

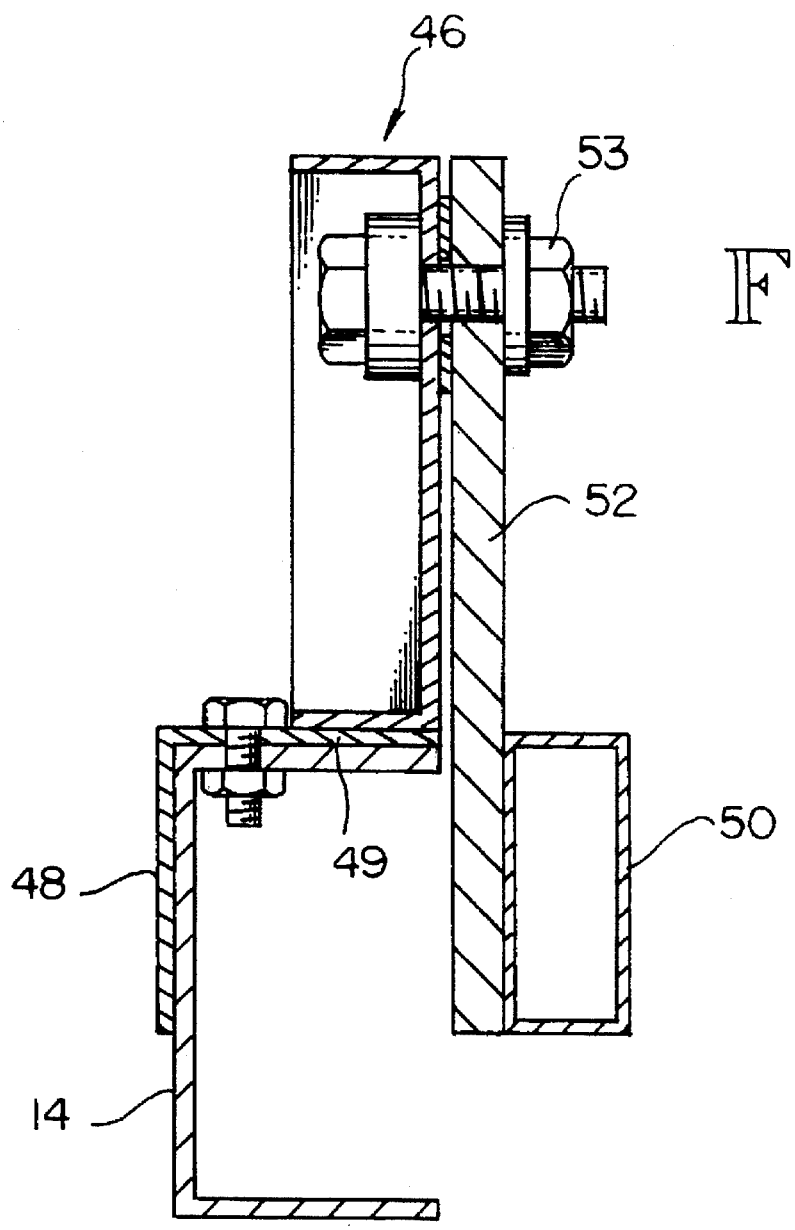

5,511,650

AIR-OPERATED CONVEYOR BELT TENSIONING APPARATUS

TECHNICAL FIELD

This invention relates generally to conveyor belt scale systems and more specifically concerns a belt tensioning apparatus for such systems.

BACKGROUND OF THE INVENTION

Belt conveyors are used in a variety of situations to move material from a storage hopper at an infeed end to an outfeed end at the desired destination for the material. These belt conveyors can vary considerably in length; it is not unusual to find such conveyors covering distances from 20 to 100 feet and even longer. Such conveyors are useful for a variety of purposes. In the construction industry, for instance, they can be used to transport fill material such as clay, crushed rock, soils, or combinations thereof, for use in landfill construction sites, e.g. dams, parking lots and log yards, among others. In such situations, it is important to accurately know the weight of the material which is being moved by the conveyor, and hence, such systems typically include a scale mounted along the conveyor for weighing the material; such systems are hence known as conveyor belt scale systems.

Conveyor belt scale systems can have a variety of configurations. In one example, the conveyor system comprises an elongated supporting frame which includes a plurality of lateral roller assemblies at spaced intervals, every three feet or so, along the length of the frame for support of an endless belt. The roller assemblies can be arranged in a variety of ways. In one example, a single lateral roller assembly includes two side rollers which angle upwardly and an intermediate level roller, thereby giving the belt a trough-like appearance. The upper run of the belt moves along the top of the successive spaced roller assemblies, the belt forming a trough in accordance with the configuration of the roller assemblies. The lower or return run of the belt typically is located a short distance beneath the upper run.

In such belt scale systems, accuracy is important; a typical accuracy goal is approximately ±1 or ±2 percent. As part of the accuracy requirement, it is important that the readout display portion of the scale maintain a consistent zero. A consistent zero requires that the belt be properly tensioned. In conventional systems, the desired tension is maintained through what are known as gravity take-up systems, which comprise a series of weights of various amounts which are hung from the return run portion of the belt.

Gravity take-up systems, while effective in some situations, have several disadvantages. First, the weights are cumbersome, difficult to work with and bulky. Also, because the weights are provided in discrete amounts, the proper combination of weights to produce a particular tension may not be available. Further, it is necessary at regular intervals to stop the conveyor and re-zero the belt by adding or subtracting weights, due to physical changes in the belt itself, typically following initial operation. This is expensive and time-consuming and hence is undesirable. Lastly, and perhaps most importantly, conventional gravity take-up systems are not operable with a small or portable belt conveyor system, since there is typically not enough room under the conveyor system for the hanging weights. This is especially true for those systems which must operate within a confined space.

Hence, it would be desirable to have a system for tensioning a conveyor belt which is susceptible to the above-described disadvantages.

SUMMARY OF THE INVENTION

The present invention is thus an apparatus for tensioning a conveyor belt used in a belt conveyor scale system, the belt including an upper run portion for support of material thereon, a conveyor frame for supporting the upper run, and a lower return run portion, wherein the apparatus comprises: an open center tensioning frame assembly; means for mounting the tensioning frame assembly to the conveyor frame beneath the upper run portion of the belt in such a manner that said tensioning frame assembly can move, i.e. rotate, about said mounting means; a first set of rollers mounted so that they extend substantially across said tensioning frame assembly in the vicinity of opposing ends thereof, a first roller being positioned above said tensioning frame assembly, while a second roller is positioned below said tensioning frame assembly, wherein the return run portion of the belt extends over the first roller and under the second roller; and means connected to said tensioning frame assembly for moving said tensioning frame assembly to selectively increase or decrease tension on the belt.

BRIEF DESCRIPTION OF THE DRAWINGS

FIG. 1 is a perspective view of a belt scale conveyor on which the belt tensioning apparatus of the present invention can be used.

FIG. 2 is a side elevational view of the belt tensioning apparatus of the present invention as well as a scale, for use with the belt conveyor of FIG. 1.

FIG. 3 is a perspective view of the belt tensioning apparatus of FIG. 2.

FIG. 8 is a cross-sectional view of the scale of FIG. 6, taken along lines 8—8 in FIG. 7.

BEST MODE FOR CARRYING OUT THE INVENTION

Figure 4:
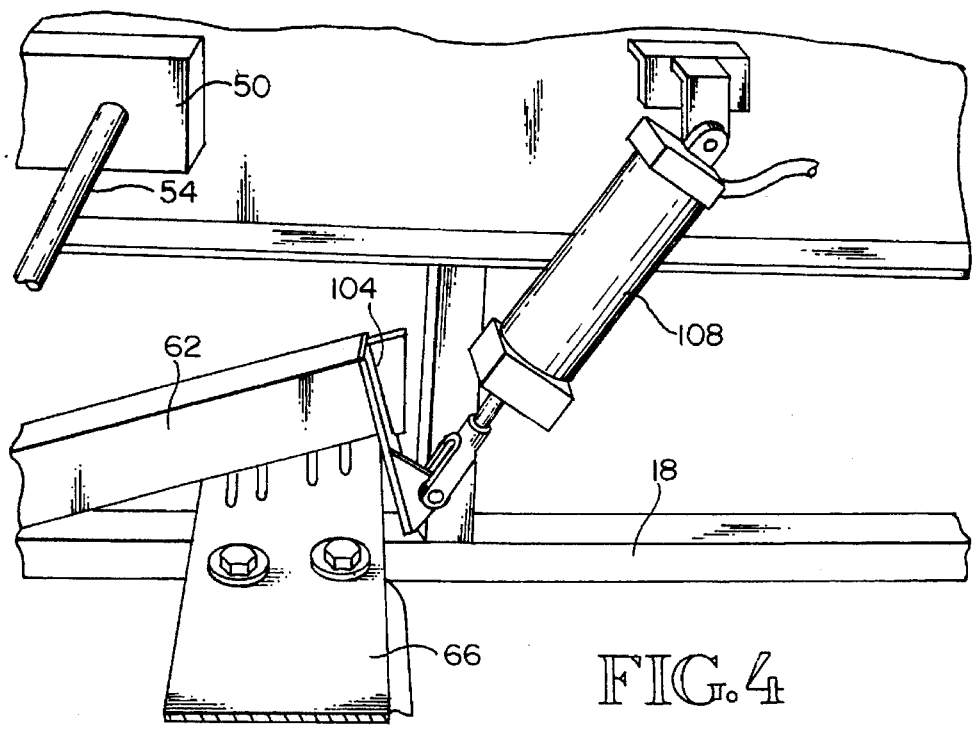
FIG. 4 is a side elevational view of a portion of the belt tensioning apparatus of FIG. 2.
Figure 5:
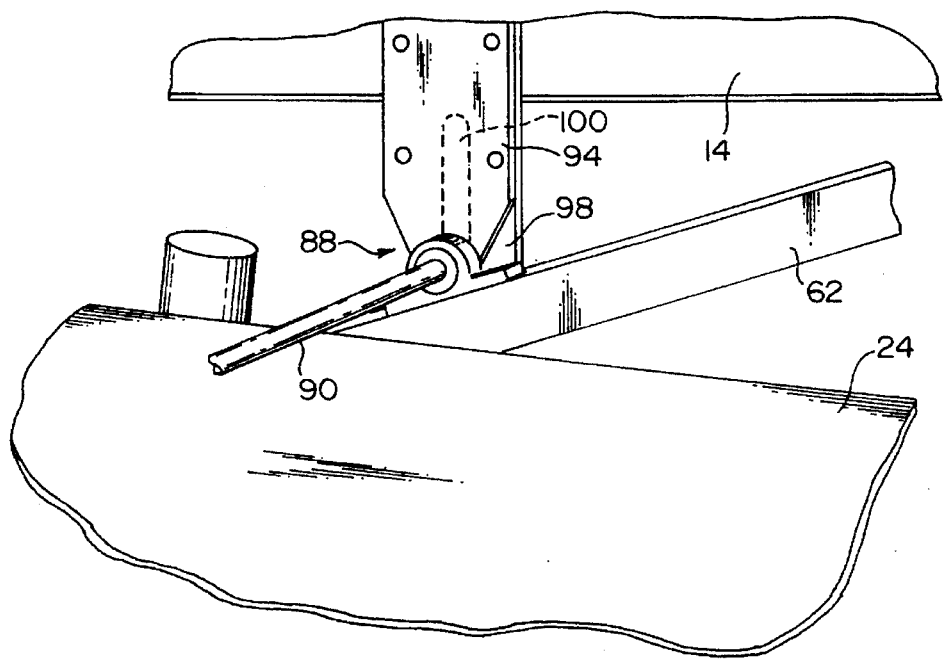
FIG. 5 is a side elevational view of another portion of the belt tensioning apparatus of FIG. 2.

FIG. 1 shows a belt scale conveyor system on which the present invention may be used. The particular conveyor system shown, referred to generally at 10, is approximately 60 feet long and 3 feet wide in the particular embodiment shown, although this is for illustration only, since those dimensions can be varied significantly. The belt tensioning apparatus of the present invention is useful with conveyors which are much shorter, i.e. 20 feet, as well as conveyors which are longer and with conveyors which are wider and narrower than 3 feet. The conveyor system 10 includes a conveyor frame shown generally at 12. The conveyor frame 12 includes two longitudinal braces 14 and 15 supported by a plurality of successive intermediate vertical trusses 16 and two lower channel members 18 and 19. The particular frame construction shown is for illustration only, as various frame arrangements may be used. The conveyor frame 12 can either rest on the ground or be supported off the ground by support members (not shown) of various configurations.

The conveyor system 10 includes an endless conveyor belt shown generally at 20. The conveyor belt 20 includes an upper run portion 22 and a lower, return run portion 24. The upper run 22 is supported by a series of successive roller assemblies shown at 26. The roller assemblies 26 in the embodiment shown typically, but not always, include two angularly oriented outside rollers 28, 30 and an intermediate, level roller 32. Such roller assemblies thus have a trough-like configuration, with the upper run 22 of the belt lying against those rollers such that the upper run forms a shallow trough configuration as well. While most of the roller assemblies 26 of the conveyor 10 have the above-described angled arrangement, a certain number of roller assemblies, particularly toward the infeed end of the conveyor, may comprise several adjacent level rollers, i.e. the rollers are all in the same plane, such as shown at 26a in FIG. 1.

The belt 20 is powered by means of a drive assembly which includes a motor and control unit 36. The drive assembly moves the conveyor belt, and is typically controlled by an operator, although it could be automatic as well.

All of the above-described elements in a belt scale system are conventional and well known in the belt scale system art, and hence have not been disclosed in detail.

In operation of the belt scale conveyor 10, material to be conveyed, such as soil, crushed rock, etc., is moved from a storage hopper 37 to an infeed end 39 of the conveyor system. The conveyor is then turned on by activating the control unit 36 and the material is moved the length of the conveyor until it reaches the outfeed end (not shown), at which point the material is dropped off the belt conveyor and the belt begins its return run.

A scale for use with the conveyor system of FIG. 1 must have the capability of weighing the material as it moves along the conveyor by the endless movement of the belt. The conveyor scale is shown generally at 40. Scale 40 includes a conventional load cell 42 which extends across the conveyor, with the load cell being bolted to the two spaced longitudinal braces 14 and 15 of the conveyor frame. The load cell includes a plurality of strain gages (not shown) which are sensitive to the bending of the load cell and which are typically connected in a bridge arrangement to produce an output which is transmitted to a meter 45 which produces a weight display.

Figure 6:
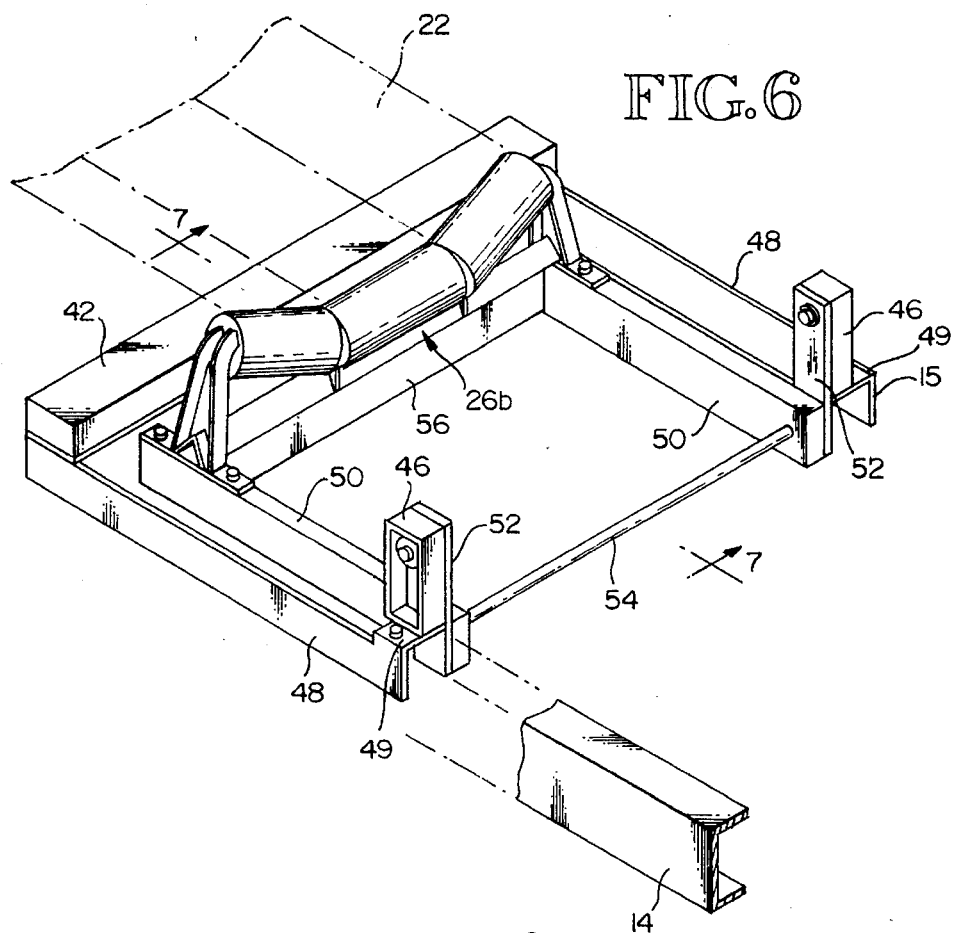
FIG. 6 is a perspective view of the belt conveyor scale shown in FIG. 2.
Figure 7:
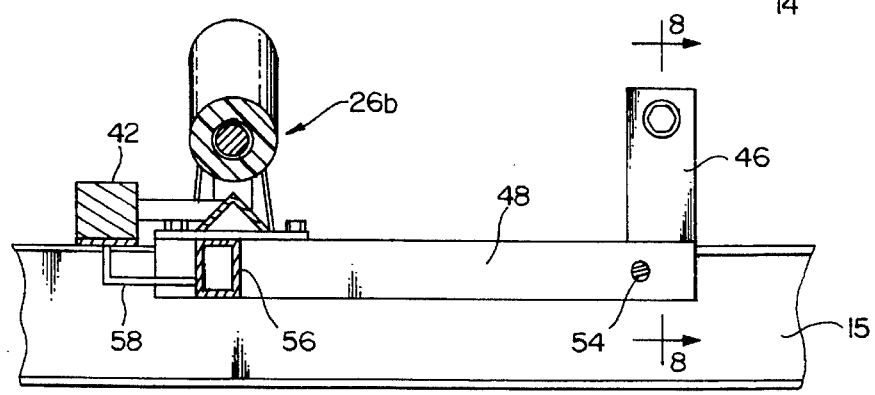
FIG. 7 is a cross-sectional view of the scale of FIG. 6, taken along lines 7—7 in FIG. 6.

Referring to FIGS. 6–8, the scale includes an outer open center frame which includes spaced elongated plates 48 which are connected to and extend from the opposing ends of the load cell, along the outer surfaces of opposed braces 14 and 15. At the other end of each plate 48 is an ear portion 49 which is bolted to the upper surface of the braces 14 and 15, along with an upstanding support member 46. Rotatably connected to the upstanding support members 46 is an inner open center frame which includes spaced longitudinal channel members 50 which are positioned adjacent the inner surface of the braces 14 and 15. The channel members 50 are connected to the upstanding support members 46 by plate elements 52 which are welded, respectively, to the infeed ends (the ends closest to the infeed end of the conveyor) of channel members 50. The plates 52 are connected to support members 46 near the tops thereof by bolt/nut combinations 53, which permit the inner frame to rotate slightly about that point, when weight bears against the outfeed end of the inner frame. Extending between the infeed ends of channel members 50 is a cross-bracing rod 54.

Connected between the outfeed ends of channel members 50 is a cross-channel 56, on the upper surface of which is mounted a roller assembly 26b which in turn supports the upper run 22 of the conveyor belt.

Extending toward the outfeed end of the scale from cross-channel 56 is a connecting arm assembly 58 which is secured to the lower surface of load cell 42. The weight of the material on the upper run of the conveyor will force the roller assembly 26b, and hence the outfeed end of the inner frame, downwardly. This in turn will result in downward force on the load cell 42 through connecting arm assembly 58, creating a bending moment which is sensed by the strain gages in the load cell. The output of the strain gages is then processed by conventional metering electronics to produce a display of actual weight on display 45.

The belt tensioning device of the present invention is shown in FIG. 1 beneath the scale assembly 40 and operates on the lower, return run 24 of belt 20. Referring to FIGS. 2 and 3, the belt tensioning device, shown generally at 60, includes two opposed, elongated 2×3-inch channel members 62—62. Secured between the respective ends of the opposed channel members 62—62 are cross-plate members 64 and 66. For reference, the end of the belt tensioning apparatus 60 which is nearest the infeed end of the conveyor is referred to as the infeed end 68, while the opposing end is referred to as the outfeed end 70. Cross-plate member 64 on the outfeed end 70 is bolted to the upper surface 71 of each of the two opposed channel members 62, while cross-plate 66 is bolted to the lower surface 73 of each of the two channel members 62 at the infeed end 68. Extending upwardly from cross-plate 64 are two L-shaped mounting members 72 and 74, bolted to cross-plate member 64 near the opposing ends thereof, i.e. near their connection points with the opposed channel members 62—62. Rotatably supported between mounting members 72 and 74 is an elongated roller 76. Roller 76 in the embodiment shown is 6 inches in diameter and is rubber covered.

Extending downwardly from infeed end cross-plate 66 are two mounting members 78 and 80, similar to mounting members 72 and 74. Rotatably supported between mounting members 78 and 80 is a roller 82, which is also 6 inches in diameter and has a rubber surface, similar to roller 76.

Bolted to the upper surface 71 of each opposing channel member 62 are two bearing assemblies 86 and 88; positioned between the two bearing assemblies 86 and 88 is a cross-rod 90. The respective ends of cross-rod 90 extend beyond the bearing assemblies 86 and 88 into an opening in vertical support plates 92 and 94, which are bolted to the inside surfaces of vertical trusses 96 and 98 which form part of the conveyor frame. Trusses 96 and 98 each include a vertical slot 100 therein through which cross-rod 90 also extends. In this arrangement, the belt tensioner 60 is free to swivel in the vertical plane about rod 90, by virtue of bearing assemblies 86 and 88.

Connected to the infeed ends of channel members 62—62 are two small support plates 102 and 104. Connected between support plates 102 and 104, respectively, and braces 14 and 15 of the conveyor frame are two conventional air cylinders 106 and 108, which are in turn connected to a source of compressed air (not shown). The actuator arm portion of the two air cylinders connects directly to the respective plates 102, 104.

The belt tensioning apparatus 60 also includes two rollers 110 and 112 which are mounted on the upper surface 71 of each channel member 62, approximately midway between cross-rod 90 and the outfeed end of the tensioning apparatus. The rollers 110 and 112 are approximately 4 inches in diameter and approximately 6 inches high and are free to rotate about their mounting rods. They are end-mounted so that they extend approximately vertically, but are angled somewhat toward the infeed end of the tensioning apparatus, as shown in FIG. 3. The rollers 110 and 112 in effect act as a boundary for the moving return run portion of the belt. The return run portion of the belt is positioned so that it extends over the outfeed roller 76, underneath cross-rod 90, between channel members 62—62, and then underneath infeed roller 82, as shown in FIG. 2.

In operation, actuation of air cylinders 106 and 108 to extend the actuator arms of the air cylinders will force the respective infeed ends of channel members 62—62 downwardly, rotating the entire belt tensioning apparatus in a clockwise direction (in FIG. 2), which increases the tension on the belt, while deactivating the air cylinders, so as to retract the arms, results in a counterclockwise rotation of the tensioning apparatus, and a reduction of the tension on the belt. The use of air cylinders is advantageous, since they provide precise control over the rotational position of the belt tensioning apparatus and hence the tension of the belt. This eliminates the discrete stepwise tension increases or decreases produced by adding or subtracting discrete weights. The above-described apparatus has in effect an infinite number of tension settings and is hence more accurate and reliable.

In actual operation of the system, an operator will read the display 45 when there is no load on the conveyor. If the display is off zero, the operator will adjust the tension by control of the air cylinders until the desired zero has been achieved.

Hence, a reliable, efficient and convenient system for adjusting the tension on a belt conveyor scale has been described. It is further advantageous because it can be used on a compact conveyor system, a portable system, or in a confined space.

Although a preferred embodiment of the invention has been disclosed herein for illustration, it should be understood that various changes, modifications and substitutions may be incorporated in such embodiment without departing from the spirit of the invention which is defined by the claims which follow:

I claim:

1. An apparatus for tensioning a conveyor belt used in a conveyor belt scale system for transporting construction material such as rock and soil over a considerable distance at construction sites, the conveyor belt including an upper run portion for support of the construction material thereon, and a lower return run portion, the conveyor system further including a conveyor frame for supporting the upper run, the apparatus comprising:

an open center tensioning frame assembly having infeed and outfeed end members and two connecting side members, wherein the end members and side members define a tensioning frame plane;

means for mounting the tensioning frame assembly to the conveyor frame beneath the upper run portion of the belt in such a manner that said tensioning frame assembly can move about said mounting means such that as the infeed end of the tensioning frame assembly moves downwardly, the outfeed end thereof moves upwardly and vice versa;

a first set of rollers mounted on the tensioning frame assembly so that they extend substantially across said tensioning frame assembly in the vicinity of the infeed and outfeed ends thereof, a first roller being positioned on a first mounting assembly which extends above the tensioning frame plane at the infeed end of the tensioning frame assembly, while a second roller is positioned on a second mounting assembly which extends below the tensioning frame plane at the outfeed end of the tensioning frame assembly, wherein the return run portion of the belt extends over the first roller, through the open center area of the tensioning frame assembly and under the second roller; and fluid actuated means connected to said tensioning frame assembly for maintaining precise control over the position of the tensioning frame assembly and hence precise control over the tension on the belt.

2. An apparatus of claim 1, wherein said control means includes air cylinder means, wherein said mounting means for the tensioning frame assembly includes two bearing assemblies located on opposite sides of said tensioning frame assembly, approximately mid-length thereof, and an elongated member which extends across said tensioning frame assembly and through the bearing assemblies, the mounting means for the tensioning frame assembly further including two support members which are mounted at opposite sides of the conveyor frame, the support members having openings therein through which opposing ends of the elongated member extend, such that the tensioning frame assembly can rotate in the vertical plane about said elongated member, controlled by said air cylinder means.

3. An apparatus of claim 1, including a second set of rollers, mounted so that they extend upwardly from the side members of the tensioning frame assembly, thereby defining lateral boundaries for the return run portion of the belt.

4. An apparatus of claim 1, wherein the control means includes air cylinder means for controlling the movement of the tensioning frame assembly continuously through a selected angular range of rotation.

5. An apparatus of claim 1, wherein the first mounting assembly includes a first pair of mounting members extending upwardly from said tensioning frame assembly, the first roller being rotatably mounted between said first pair of mounting members, and wherein the second mounting assembly includes a second pair of mounting members extending downwardly from said tensioning frame assembly, the second roller being rotatably mounted between said second mounting members.

* * * * *